United States Patent
Kim et al.

(10) Patent No.: US 10,083,211 B2
(45) Date of Patent: Sep. 25, 2018

(54) ITEM RECOMMENDATION METHOD AND APPARATUS

(71) Applicant: INDUSTRY-UNIVERSITY COOPERATION FOUNDATION HANYANG UNIVERSITY, Seoul (KR)

(72) Inventors: Sang Wook Kim, Seoul (KR); Won Seok Hwang, Seoul (KR); Juan Parc, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 410 days.

(21) Appl. No.: 14/810,359

(22) Filed: Jul. 27, 2015

(65) Prior Publication Data

US 2016/0171036 A1    Jun. 16, 2016

(30) Foreign Application Priority Data

Dec. 10, 2014   (KR) .................. 10-2014-0177452

(51) Int. Cl.
*G06F 17/30* (2006.01)
*G06N 99/00* (2010.01)

(52) U.S. Cl.
CPC .. *G06F 17/30522* (2013.01); *G06F 17/30864* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 7,788,123 B1* | 8/2010 | Ekhaus | G06Q 30/02 705/26.7 |
| 7,917,829 B2* | 3/2011 | Livshitz | H03M 13/1111 714/752 |
| 2004/0093293 A1* | 5/2004 | Cheung | G06Q 40/06 705/36 R |
| 2006/0246109 A1* | 11/2006 | Hossainy | A61L 31/10 424/426 |
| 2008/0155385 A1* | 6/2008 | Jeong | H03M 13/116 714/801 |
| 2010/0100516 A1* | 4/2010 | Zhou | G06N 5/02 706/46 |
| 2010/0153823 A1* | 6/2010 | Noda | H03M 13/033 714/777 |
| 2012/0030159 A1* | 2/2012 | Pilaszy | G06Q 10/00 706/46 |

(Continued)

FOREIGN PATENT DOCUMENTS

JP   2012-079225 A    4/2012
KR  10-2002-0080063 A  10/2002

(Continued)

*Primary Examiner* — Hung Le

(74) *Attorney, Agent, or Firm* — Novick, Kim & Lee, PLLC; Sang Ho Lee

(57) ABSTRACT

An item recommendation method and apparatus are provided. The item recommendation method and apparatus may recognize items preferred before a user uses items, based on items rated by the user, and may recommend an item to the user based on preferences for the recognized items.

18 Claims, 9 Drawing Sheets

(56) References Cited

U.S. PATENT DOCUMENTS

2012/0158741 A1\* 6/2012 Scholz ................ G06F 17/3053
                                                                        707/748
2013/0227378 A1\* 8/2013 Yamamoto .......... H03M 13/033
                                                                        714/776

FOREIGN PATENT DOCUMENTS

| KR | 10-2009-0010866 A | 1/2009 |
| KR | 10-2009-0020817 A | 2/2009 |

\* cited by examiner

Users given rating matrix

FIG. 3

| Movie | Pre-use preference | Post-use preference | Rating |
|---|---|---|---|
| Movie#1 | High | High | 5 |
| Movie#2 | High | Low | 1 |
| Movie#3 | Not high | Unknown | Unrated (Probably 0) |

ITEM RECOMMENDATION METHOD AND APPARATUS

CROSS-REFERENCE TO RELATED APPLICATION

This application claims the benefit of Korean Patent Application No. 10-2014-0177452, filed on Dec. 10, 2014, in the Korean Intellectual Property Office, the disclosure of which is incorporated herein by reference.

BACKGROUND

1. Field of the Invention

The following description relates to an item recommendation method and apparatus, and more particularly, to an item recommendation method and apparatus to recommend an item that may be preferred by a user based on items rated based on preferences by the user.

2. Description of the Related Art

An item recommendation system may provide functions of selecting at least one item from a plurality of items based on a preference of a user and of recommending the selected item to the user. To select an item that may be preferred by the user, the item recommendation system may collect information about a grade, a purchase, a click or a bookmark associated with an item, and may predict the preference of the user based on the collected information. Also, the item recommendation system may recommend an item to the user in a descending order of preferences for items predicted based on the collected information.

The item recommendation system may need to more carefully and accurately select an item and need to recommend the selected item to the user. In other words, because the user is not able to verify all available items due to constraints of time and money, the user may receive a recommendation for an item from the item recommendation system. Accordingly, the item recommendation system may need to recommend a more accurate item to satisfy the above requirements of the user.

An conventional item recommendation system may recommend an item to a user based on users' preferences inferred from their rated items. Since most users have rated only a few items, the conventional item recommendation system suffers from low accuracy. The users' unrated items can provide more information about users' preferences, but the conventional recommendation system overlooks them. Specifically, some of unrated items are not evaluated (given ratings) by a user because the user is not interested in them.

Accordingly, there is a desire for a method of more accurately predicting a preference of a user and recommending an item to the user based on the predicted preference in an item recommendation system.

SUMMARY

An aspect of the present invention provides item recommendation method and apparatus.

Another aspect of the present invention provides an apparatus and method for distinguishing items preferred by a user from items that are not preferred, and excluding the items that are not preferred from items to be recommended.

According to an aspect of the present invention, there is provided an item recommendation method including generating a rating matrix based on a relationship between a user and an item, the rating matrix including items' given ratings that imply users' post-use preferences, generating an observed pre-use preference matrix by changing the post-use preference for a rated item in the rating matrix, inferring a pre-use preference for an unrated item in the rating matrix; determining a pre-use preference matrix by applying the inferred pre-use preferences for the unrated items into the observed pre-use preference matrix; and generating a zero-injected matrix using the rating matrix and the pre-use preference matrix.

The generating of the rating matrix may include generating a rating matrix associated with rated items after a plurality of users uses a plurality of items based on a propensity to use the items.

The generating of the pre-use preference matrix may include changing the post-use preference for the rated item in the rating matrix to "1".

The inferring the pre-use preference may include inferring the pre-use preference for the unrated item based on a number of the rated items evaluated by each user in the rating matrix.

The inferring the pre-use preference may include inferring the pre-use preference for the unrated item based on the post-use preference of the rated item in the rating matrix.

The generating a zero-injected matrix may include assigning a zero rating to an uninteresting item of the user.

The uninteresting item is unrated item having the inferred pre-use preference smaller than a threshold preference among the unrated items in the pre-use preference matrix.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 3 illustrates a pre-use preference and post-use preference for each of the item according to an embodiment.

DETAILED DESCRIPTION

Figure 1:
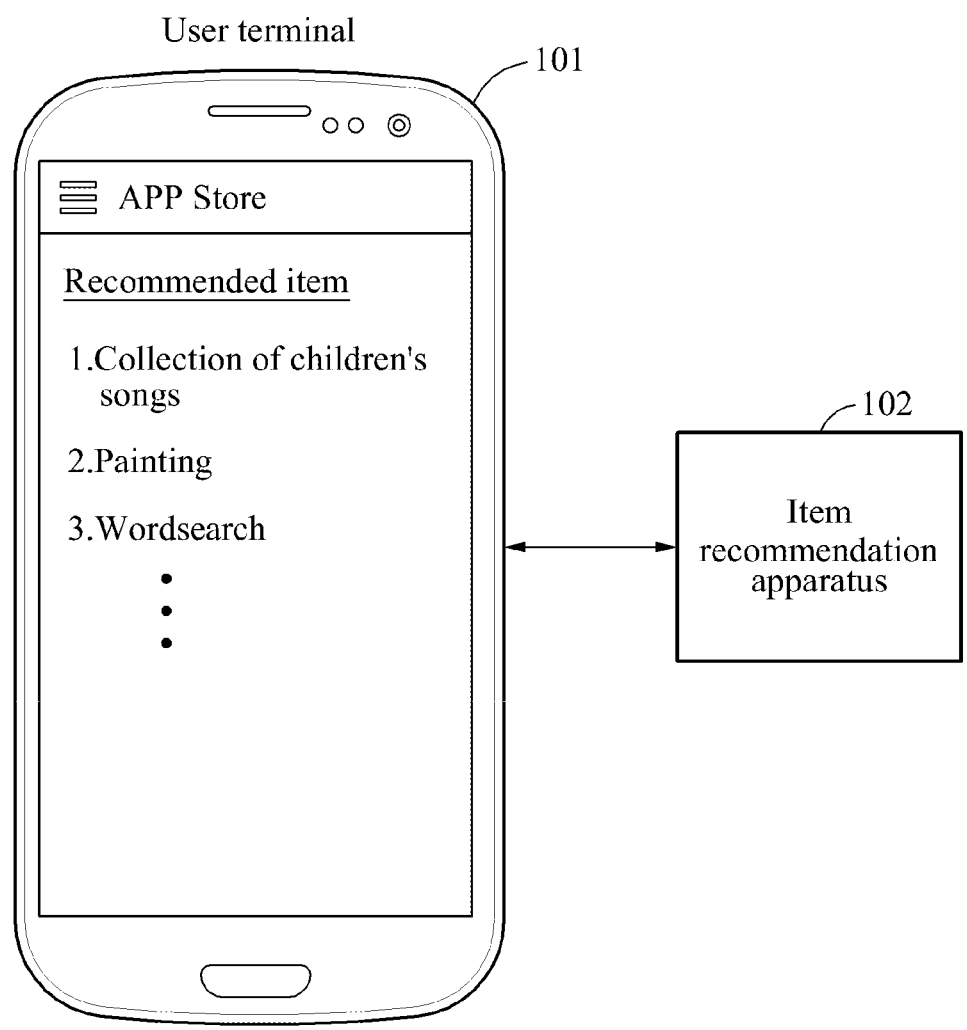
FIG. 1 is a diagram illustrating an item recommendation apparatus for recommending an item based on a user's preferences according to an embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating an item recommendation apparatus 102 for recommending an item based on a user's preference according to an embodiment.

Referring to FIG. 1, an item recommendation method may be used to predict an item optimized for a user based on a post-use preference for the rated item evaluated by the user, and to provide the user with the predicted item. The item recommendation method may be performed by an item recommendation apparatus for recommending an item to a user.

The item recommendation apparatus 102 may be an apparatus for recognizing preferences of a user and recommending an item to the user based on the recognized preferences. The item recommendation apparatus 102 may be, for example, a processor included in an application server to provide a user with an application associated with content, or in a content production server to produce and distribute content.

A user terminal 101 may receive an input of an item recommendation request associated with a recommendation of an item from the user, and may transfer the received item recommendation request to the item recommendation apparatus 102. The user terminal 101 may be implemented by, for example, a personal computer (PC), a smartphone, a tablet, or a wearable device that may receive recommendation information associated with content including games or advertisements and that may execute the content. Also, the item recommendation apparatus 102 may extract an item optimized based on the user's preference in response to the item recommendation request being received through the user terminal 101. For example, the item recommendation apparatus 102 may extract an item that is not used by the user but is considered interesting when the user discovers the item. In other words, the item recommendation apparatus 102 may extract the optimized item based on a user's propensity for an item, for example, a user's preference for an item.

The item recommendation apparatus 102 may predict an item based on a user's preferences through the following process. For example, the item recommendation apparatus 102 may extract a user's post-use preference from rated items of the user that have been previously used by the user in response to the item recommendation request. The rated items that have been previously used by the user may include, for example, a paid item purchased by a user, a free item distributed free, or an item that is currently being used or have been used once by a user. The rated item may refer to an item to which a post-use preference is assigned based on an experience of a user after the user has already used the item. In the present disclosure, an item whose preference is specified by a user may be referred to as a "rated item."

In addition, the item recommendation apparatus 102 may generate a rating matrix based on relationships between users and items. The rating matrix may have a form of "m×n," and may include items that are rated based on post-use preferences by the user. The item recommendation apparatus 102 may define a post-use preference for a rated item evaluated by a user as a rating. A post-use preference determined after the user uses the item may be set to various values by the user based on a multi-valuation scheme. For example, the post-use preference may be set to have various values of "1" to "n" based on a preference determined based on a criterion to rate an item or a user's degree of interest in or concern for an item. In other words, the user may set a post-use preference for an item using the multi-valuation scheme based on a use function, a utilization, a convenience or an interest in association with the item.

Accordingly, the rating matrix may include a post-use preference of a user who desires to receive an item recommendation. An entry of the rating matrix may be assigned a post-use preference for the rated item evaluated by the user. In other words, evaluation of an item by a user may indicate giving the item a grade implying a worth or level of the item.

To compute a more accurate result associated with a user's post-use preference, the item recommendation apparatus 102 may generate a pre-use preference matrix used to recognize a user's pre-use preference that indicate the user's preference before the user uses an item based on the external features of the item. To this end, the item recommendation apparatus 102 may assign a value of "1" to a rated item evaluated by a user, in the rating matrix, and may generate the pre-use preference matrix.

For example, the item recommendation apparatus 102 may change a post-use preference for each of rated items in the rating matrix to the same value. The item recommendation apparatus 102 may generate an observed pre-use preference matrix by changing a post-use preference for each of rated items in the rating matrix to "1,". Also, in the observed pre-use preference matrix, the value of "1" may be equally assigned to pre-use preferences using a unary valuation scheme.

In both the rating matrix and the pre-use preference matrix, the pre-use preferences and post-use preferences for a same item may be assigned to a pair of a user and the item (hereinafter, referred to as a user-item pair). However, the rating matrix and the pre-use preference matrix may differ from each other in that the multi-valuation scheme is used to assign a value in the rating matrix and the unary valuation scheme is used to assign a value in the pre-use preference matrix. Also, the rating matrix and the pre-use preference matrix may differ from each other because the rating matrix and pre-use preference matrix indicate users' preferences after using items and before using items, respectively. In other words, the pre-use preference matrix may represent information used to predict a user's preferences for items to which a value of "1" is not assigned.

Thus, the item recommendation apparatus 102 may enhance an accuracy associated with an item recommendation by taking into consideration users' pre-use preferences for unrated items that are not yet considered in the conventional systems. The users' pre-use preferences for the unrated items are determined based on post-use preference for rated items that is used and evaluated by the user. The user's pre-use preferences for unrated items that have not yet used by the user may be predicted based on the observed pre-use preference matrix implying pre-use preferences of rated items.

For example, the observed pre-use preference matrix may represent whether a user uses an item and evaluate the item, instead of representing a post-use preference for an item. In the observed pre-use preference matrix, a value of "1" may represent an item that is already used by the user. The pre-use preference matrix may be set based on only a portion of features (i.e., external features) before the user uses an item. The pre-use preference matrix may be, for example, set with only external features that may be verified before an item is used.

In an example, an external feature of a game may include, for example, a genre, a developer or a character of the game. Based on the above external features, it may be determined that a user has interest in the game. To set a common field of items, for example, a game, the item recommendation apparatus 102 may equally assign a value of "1" to preferences for the rated items.

Also, because pre-use preferences may be set in the pre-use preference matrix under assumption that a user perceives external features of items, the pre-use preferences may not be completely matched to post-use preferences to be assigned after the user uses items. The pre-use preference matrix may be information used to predict an item preferred by the user among items that have not been yet used by the user.

The item recommendation apparatus 102 may infer a pre-use preference for an unrated item based on the observed pre-use preference matrix. The item recommendation apparatus 102 may infer the pre-use preference for the unrated item based on a number of the rated items evaluated by each user in the rating matrix or the post-use preference of the rated item in the rating matrix. A scheme of setting a pre-use preference matrix will be further described with reference to FIG. 5.

The item recommendation apparatus 102 may perform filtering on pre-use preference data including determined weights for items, and may extract an item with a pre-use preference smaller than a threshold preference and an item with a pre-use preference equal to or greater than the threshold preference. The threshold preference may refer to a criterion used to assign zero ratings to the unrated items, and may be set based on settings of a manager for managing the item recommendation apparatus 102 or based on an external input. The item recommendation apparatus 102 may include different meanings for items based on how to set a criterion to perform filtering on items.

The unrated item having a pre-use preference smaller than a threshold preference is given the zero valued rating. And, post-use preference of the unrated item having equal and more than the threshold preference is estimated using a Collaborative Filtering method.

The unrated item with the pre-use preference smaller than the threshold preference may have external features that are not preferred by the user and accordingly, may have a low user's post-use preference.

As a result, the item recommendation apparatus 102 may perform zero processing on the item with the pre-use preference smaller than the threshold preference based on the above features, to prevent the item from being recommended to a user. In other words, the item recommendation apparatus 102 may generate a zero-injected matrix by assigning zero ratings to some unrated items whose pre-use preferences are smaller than a threshold preference among the unrated items in the rating matrix. In the zero-injected matrix, an entry (i.e., post-use preference) representing a user-item pair is set to "0" when the user's pre-use preference for the item is smaller than the threshold preference in order to prevent the item from being recommended to a user. The zero-injected matrix is derived from the rating matrix including a post-use preference for the rated items. And, all cells of the zero-injected matrix need to be filled. If the cell is for a rated item in the rating matrix, a post-use preference of the cell is directly assigned to the post-use preference for the rated item in the rating matrix. And, if the cell is for an unrated item having pre-use preference smaller than the threshold preference in the pre-use preference matrix, a post-use preference of the cell is assigned to the zero value. And, if the cell is for an unrated item having pre-use preference equal or more than the threshold preference in the pre-use preference matrix, a post-use preference of the cell is estimated by a Collaborative filtering method.

Figure 2:
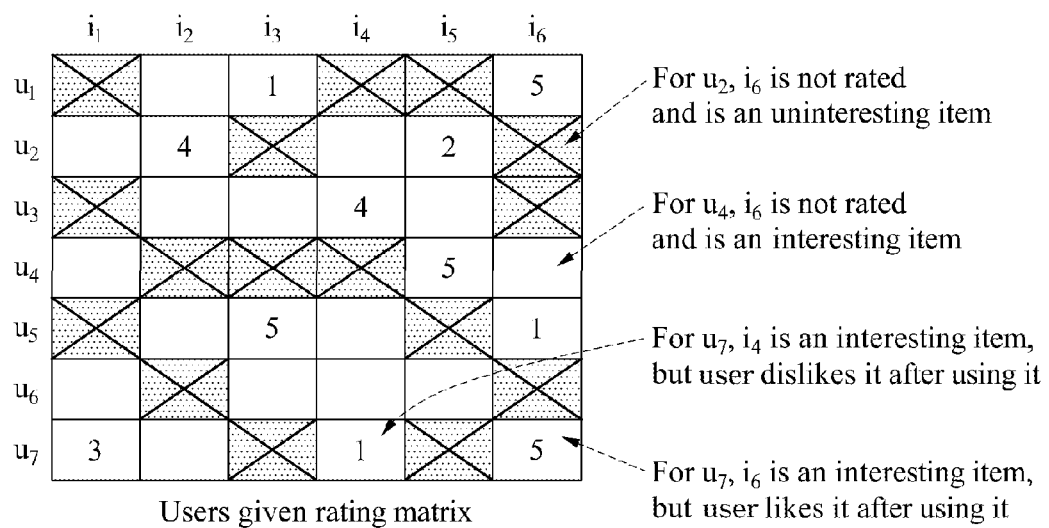
FIG. 2 is a rating matrix for items and users according to an embodiment.

FIG. 2 is a rating matrix for item and users according to an embodiment.

Collaborative filtering (CF) is one of the most popular techniques in recommender systems. Its goal is two-fold: (1) rating prediction and (2) top-N recommendation. The item recommendation apparatus 102 focuses on top-N recommendation, since it is more popularly used in real-world applications. For top-N recommendation, CF predicts relative preferences for an active user on unrated items, and then recommend top-N items with the highest preferences. In order to predict user's hidden preferences on unrated items, existing CF methods mainly focused on exploiting users' rated items to infer users' hidden preferences.

While successful to some extent, they neglect to consider the vast amount of unrated items for analyzing user preferences. Generally, 99% of whole items in a rating matrix are often unrated. These unrated items are helpful for understanding latent user preferences, and some unrated items are better to be excluded from recommendation as users are unlikely to prefer them. Such items are recognized as uninteresting items. The item recommendation apparatus identifies uninteresting items among unrated items and exploit them in CF to improve the accuracy of top-N recommendation.

To discern uninteresting items, the item recommendation apparatus adopts two types of user preferences: pre-use preference and post-use preference. Before (resp. after) a user u uses an item i, the preference that u has toward i is referred to as the pre-use preference (resp. post-use preference). In a typical scenario, u only buys/uses i whose pre-use preference is high. u has pre-use preference on i based on its external features that u could obtain without actually using i (e.g., genre or director information of a movie). After using i, based on the level of user's satisfaction, u then assigns a specific rating to i, indicating the post-use preference of u. The post-use preference is determined by the inherent features that u had not known before using I (e.g., storyline or choreography of a movie).

The item recommendation apparatus uses pre-use preferences unlike existing works that have only focused on observed ratings implying post-use preferences. By analyzing pre-use preferences, it is assumed that a user deliberately ignores some unrated items, i.e., uninteresting items because the user is not sufficiently interested in them. Even though the user has not assigned ratings explicitly, the user would give lower ratings to uninteresting items implicitly.

This is because a user is less likely to like uninteresting items than rated items. This is because an item's external and inherent features are highly correlated in terms of a user's satisfaction.

It is described that the difference between pre-use preferences and post-use preferences in a rating matrix. In FIG. 2, if a user has evaluated an item, the item is called "rated item". The rated item, which is evaluated by the user corresponds an entry having a rating score in the rating matrix. So, the rated item indicates interesting item of the user.

For user $u_7$, items $i_4$ and $i_6$ are interesting items, meaning that $u_7$ has high pre-use preferences for both $i_4$ and $i_6$. Here, the pre-use preference for the item means that the user is interested in the item or is not interested in the item. Unlike pre-use preferences, $u_7$ has a high post-use preference for $i_6$ while $u_7$ has a low post-use preference for $i_4$ due to the difference of their inherent features.

The X-marked entries in the rating matrix indicate that a user has not evaluated those items because the user is not interested in the item corresponding to X-marked entries in the rating matrix. Although X-marked entries are originally empty in a rating matrix, it is assumed that users have implicitly assigned low ratings (e.g., zero ratings). Thus, CF methods could utilize a more number of ratings by filling X-marked entries by low ratings. Remaining empty entries (not X-marked) in FIG. 2 indicate that they have not been evaluated yet but could be interesting.

Based on these notions, the goal of recommendation becomes to identify top-N items among the unrated items not evaluated but still interesting to a user (empty entries in FIG. 2). To achieve this goal, three steps is proposed: (1) The item recommendation apparatus infers pre-use preferences for unrated items by solving the one-class collaborative filtering (OCCF) problem, (2) The item recommendation apparatus assigns zero ratings to uninteresting items (in a rating matrix) whose pre-use preferences are not high, called zero-injection, and (3) The item recommendation apparatus applies any of CF methods to the zero-injected rating matrix, instead of the original rating matrix. This simple-yet-novel imputation not only addresses the sparsity problem by enriching the rating matrix but also completely prevents uninteresting items from being recommended as top-N items, thereby improving the overall accuracy greatly.

- The item recommendation apparatus defines pre-use preferences, and uninteresting items that a user has implicitly assigned a low rating for.
- The item recommendation apparatus identifies uninteresting items by using the pre-use preferences inferred by solving the OCCF problem and shows its implications and effectiveness.
- The item recommendation apparatus improves the accuracies of baseline CF methods including item-based CF, SVD-based CF, and SVD++ by 2.5 to 5 times on average.

FIG. 3 illustrates a pre-use preference and post-use preference for each of the item according to an embodiment.

It is supposed that the rating scores of uninteresting items are likely to be low based on a user's pre-use preferences. Unlike them, the rating scores of rated items depend on both pre-use preferences and post-use preferences. The ratings of uninteresting items and rated items is described, as illustrated in the following example.

Example 1 (Two preference types). FIG. 3 describes pre-use preferences and post-use preferences of user u for three movies. Initially, user u has a high pre-use preference for Movie #1 and Movie #2. On the other hand, user u has a not-high pre-use preference for Movie #3. In this case, Movie #1 and Movie #2 can be interesting items to user u while Movie #3 can be an uninteresting item. Thus, user u would decide to watch only two movies with high pre-use preferences. After watching the movies, user u likes Movie #1 but is disappointed at Movie #2.

Then, user u assigns a high rating to Movie #1 and a low rating to Movie #2. In contrast, user u does not watch Movie #3, so post-use preference of user u for the Movie #3 remains unknown (i.e., empty in a rating matrix). Because user u is less interested in Movie #3, Movie #3 is likely to get a low rating score from user u. The rating score for Movie #3 can be regarded 0 because user u is less interested in Movie #3 than Movie #2.

That is, user u implicitly gives an extremely low rating to Movie #3, (i.e., uninteresting item), based on "pre-use preferences" of the user u. Note that some unrated items are implicitly rated as low ratings based on a user's pre-use preferences without post-use preferences.

Figure 4:
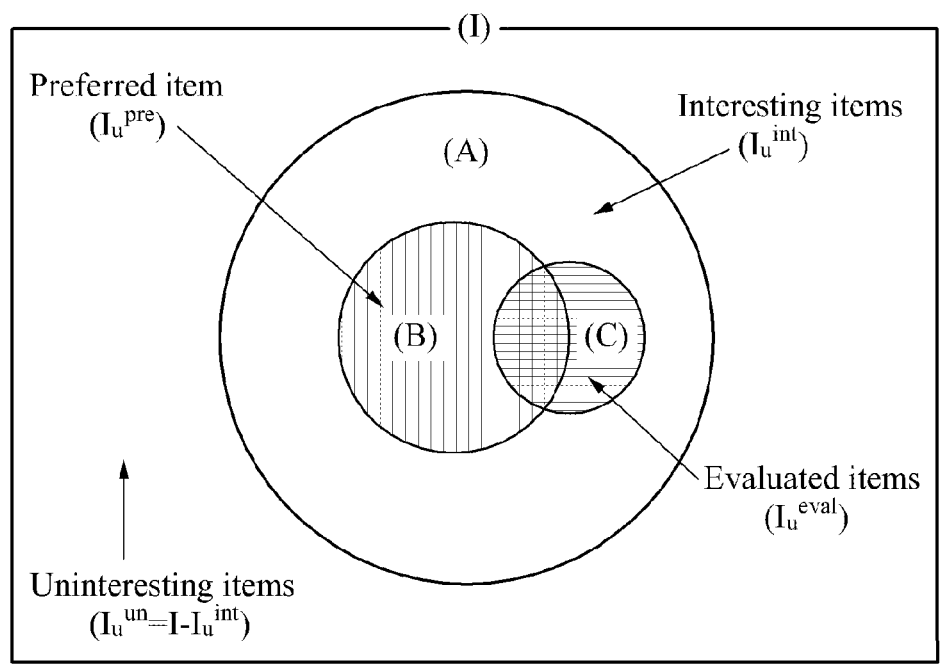
FIG. 4 is a diagram provided to explain a type of item based on a user's pre-use and post-use preferences according to an embodiment.

FIG. 4 is a diagram provided to explain a type of item based on a user's preferences according to an embodiment

TABLE 1

Notations used in item recommendation apparatus.

| Notation | Description |
| --- | --- |
| $p_{ui}$ | User u's pre-use preference on item i |
| $q_{ui}$ | User u's post-use preference on item i |
| $r_{ui}$ | A rating given to item i by user u |
| P | A pre-use preference matrix whose entry is $p_{ui}$ |
| Q | A post-use preference matrix whose entry is $q_{ui}$ |
| R | A rating matrix whose entry is $r_{ui}$ |
| $I_u^{un}$ | A set of uninteresting items for user u |
| $I_u^{int}$ | A set of interesting items for user u |
| $I_u^{pre}$ | A set of preferred items for user u |

Let $U=\{u_1, \ldots, u_m\}$ be a set of m users, $I=\{i_1, \ldots, i_n\}$ be a set of n items, and $r_{ui}$ be the rating given to item i by user u. A rating matrix is referred to as $R=(r_{ui})_{m \times n}$, and $p_{ui}$ indicates user u's pre-use preference on item i. And, $q_{ui}$ indicates user u's post-use preference on item i. Note that both types of preferences $p_{ui}$ and $q_{ui}$ exist on a user-item pair (u, i).

FIG. 4 depicts the Venn diagram of an entire set of items I for a user u. Let interesting items $I_u^{int}$ denote items with high pre-use preferences while uninteresting items $I_u^{un}$ denote items with not-high pre-use preferences.

The two item sets are disjoint, i.e., $I_u^{int} \cap I_u^{un} = \emptyset$, $I_u^{int} \cup I_u^{un} = I$. The uninteresting items are defined as follows: Definition 1 (uninteresting items). For a user u, the uninteresting items $I_u^{int}$ is defined such that: (1) $I_u^{un} \subseteq I - I_u^{int}$ and (2) $p_{ui} \leq p_{uh}$ ($\forall i \in I_u^{un}$, $\forall h \in I_u^{int}$).

Among interesting items $I_u^{int}$, user u buys/uses some items and evaluates them by assigning ratings. In a real scenario, user u would be able to evaluate only a small fraction of interesting items. This rated item set evaluated by the user u denoted by $I_u^{eval}$, is only a subset of $I_u^{int}$ (i.e., $I_u^{eval} \subseteq I_u^{int}$)

In addition, a set of items that are likely to get high ratings are preferred items, denoted by $I_u^{pre}$, which is another subset of interesting items as shown in FIG. 4 (i.e., $I_u^{pre} \subseteq I_u^{int}$).

Based on this viewpoint, the item recommendation apparatus identifies top-N preferred items to user u by using both pre-use and post-use preferences. Specifically, user u's pre-use and post-use preferences for item $i \in I_u^{eval}$ are known while both types of preferences for item $j \in I - I_u^{eval}$ are unknown. If user u has evaluated item i, its pre-use preference $p_{ui}$ can be considered high. Based on known pre-use preferences, the item recommendation apparatus infer the pre-use preferences of the remaining unknown items j. In addition, its post-use preference $q_{ui}$ can be directly indicated by the score of $r_{ui}$. If the item is evaluated by the user i, the item is called "rated item". The rated items may be determined to used items by the user i.

A problem for top-N recommendation is defined as follows:

For user u, identify top-N items $J=\{j1, \ldots, jN\}$ such that: (1) $J \subseteq I_u^{int} - I_u^{eval}$ and (2) $q_{uj_1} \geq \ldots \geq q_{uj_N} \geq q_{uy}$ ($\forall y \in I - I_u^{eval} - J$).

Existing CF methods employ user u's preferences only on rated items evaluated by the user. On the other hand, the uninteresting items $I_u^{un}$ are used and the augmented rating matrix with abundant user rating information is produced. On the other hand, uninteresting items $I_u^{un}$ are identified and are used to enrich the rating matrix with additional user ratings. In addition, CF methods according to our proposed method could exclude those uninteresting items explicitly from top-N recommendation.

The item recommendation apparatus may predict an item that needs to be actually recommended based on the user's preferences.

For example, the item recommendation apparatus may provide the user with items in a set I. The items in the set I may refer to all items available for the user. The user may select preferred items from the set I. The preferred items is denoted the $I_u^{pre}$ and determined by item of external feature and inherent feature.

For example, when the user u uses items associated with a game among the items in the set I, it may be impossible to recognize all types of information, for example, all stories, events for each of the stories, attack skills or attack equipment in association with the game. Accordingly, the user may recognize a portion of information, i.e., external features used by the user, that is, a fragmentary configuration of the game (for example, a character, a synopsis, or video for public relations), and may select an interesting item to the user.

In this example, a user's preference for a certain item may be able to change after the user uses the item. In other words, the user may continue to prefer the item after using it, or may not prefer the item after using it. In FIG. 4, the preferred items means the items preferred by a user after the user uses the item. The preferred items in the sets B is belonging to the sets A including the interesting items.

In addition, the user may evaluate items after the user uses the items based on two types of preferences. The evaluated item is identical to a rated item. The rated item means an item evaluated by the user, after the user uses the item. So, the rating of rated item indicates a post-use preference.

The items in the difference of the sets, C-B may be set as items with relatively low user's preferences, and may have relatively low post-use ratings. In the other words, a portion of sets C excluded the sets B may have low post-use preference. The items in the intersection of the sets C and B may be set as items with relatively high user's preferences, and may have relatively high post-use preferences. Accordingly, the item recommendation apparatus may ultimately need to recommend items belonged to the intersection of the sets C and B.

As a result, the item recommendation apparatus may predict a user's pre-use preferences for the unrated item using based on post-use preference of the rated item. The item recommendation apparatus may perform filtering on the items with the relatively low user's pre-use preferences during a recommendation process, to recommend top N items to the user. The relatively low user's pre-use preferences may be set to zero.

Figure 5:
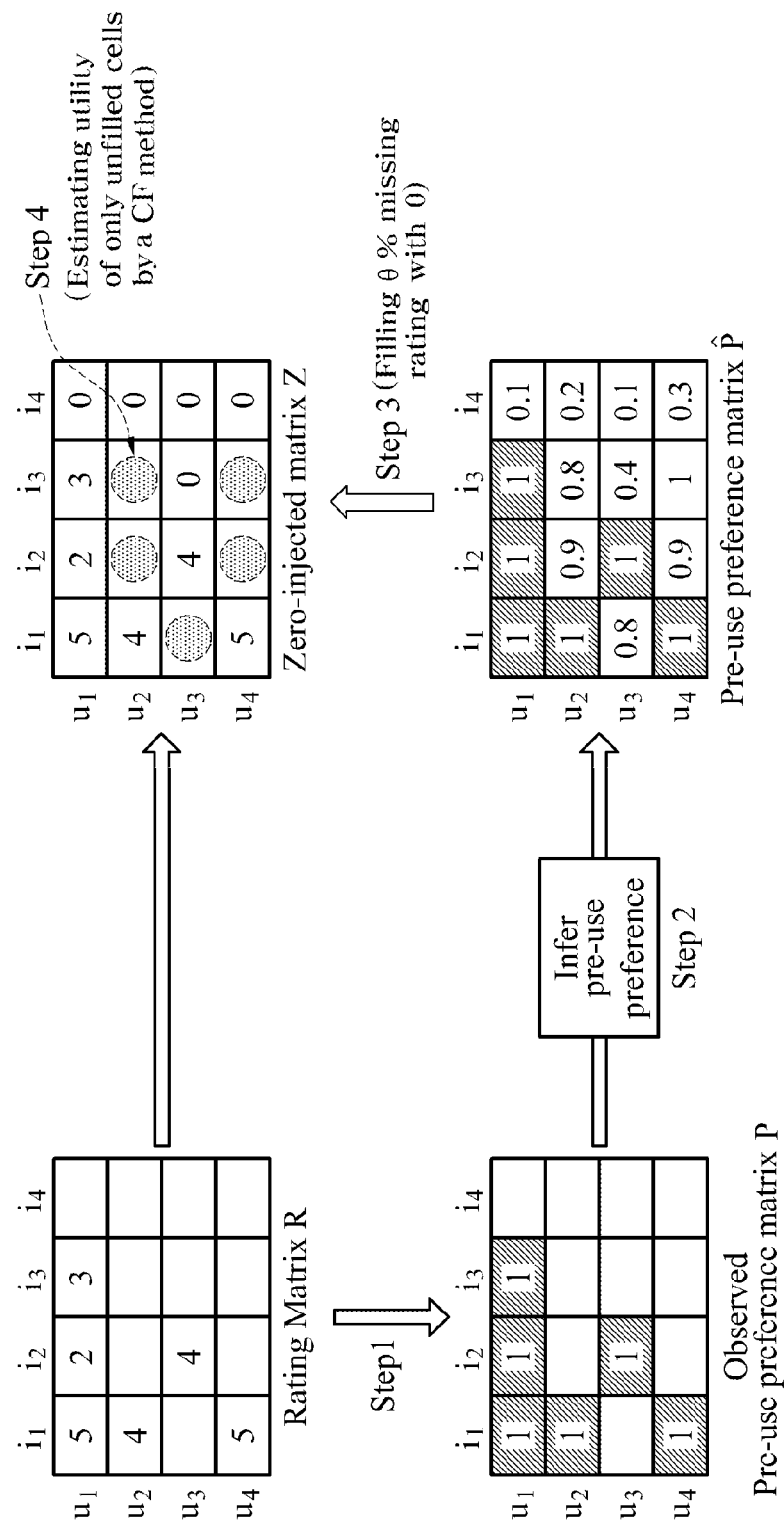
FIG. 5 is a diagram provided to explain a process of recommending items based on users' pre-use and post-use preferences according to an embodiment.

FIG. 5 is a diagram provided to explain a process of recommending an item based on a user's pre-use and post-use preferences according to an embodiment.

The main challenges of our proposed method are twofold: (1) how to identify uninteresting items for a user and (2) how to exploit uninteresting items thus discerned in CF methods. To address the challenges, FIG. 5 depicts the overall process of our proposed approach.

First, the item recommendation apparatus build a pre-use preference matrix $P=(p_{ui})$ m×n by examining a rating matrix $R=(r_{ui})$ m×n. Because the pre-use preferences for 'rated' user-item pairs are known, the pre-use preference $p_{ui}$ of a user u on an item i is set to 1 when $r_{ui} \in R$ is observed (Step 1).

Referring to a top left portion of FIG. 5, an item recommendation apparatus may extract rated items having post-use preference from all items available for the user. The user may be a target user who desires to receive an item recommendation, or a user having relationship with the target user on the social network. Also, the item recommendation apparatus may generate a rating matrix based on relationships between users and rated items.

The rating matrix may be information that is associated with ratings of a user on items based on post-use preferences and that is represented in the form of an "m×n" matrix. The rating matrix may be included post-use preferences for the rated items which are used and evaluated by the user.

For example, the rating matrix may be represented in the form of the "m×n" matrix based on relationships between users $u_1$, $u_2$, $u_3$ and $u_4$ and items $i_1$, $i_2$, $i_3$ and $i_4$.

The item recommendation apparatus may generate an observed pre-use preference matrix based on the rating matrix. Based on the rated items having post-use preferences in the rating matrix, the item recommendation apparatus may generate the observed pre-use preference matrix.

Referring to a bottom left portion of FIG. 5, the item recommendation apparatus may generate an observed pre-use preference matrix representing whether the user evaluates the items after the user actually uses an item.

For example, a user may evaluate the items after the user uses items. As result of evaluation of the user, the items has post-use preferences. Those items called "rated items". In this example, according to an embodiment of the present invention, the item recommendation apparatus needs to select the item to be recommended to the user. The item may be preferred by the user based on the rated items previously evaluated by the user.

The item recommendation apparatus may determine the rated items as items that could be interesting to the user before the user uses the items, and may generate a observed pre-use preference matrix in which a pre-use preference for a rated item is set to a value of "1" based on a determination result. Thus, the item recommendation apparatus may generate the observed pre-use preference matrix to include a value indicating whether the user uses items. The value 1 is the highest pre-use preference because we represent $p_{ui}$ as a real value in [0, 1].

Also, the item recommendation apparatus may infer a pre-use preference for unrated items. The item recommendation apparatus predicts pre-use preferences on 'unrated' user-item pairs (u, i) (i.e., $p_{uj}$=null) based on the other observed pre-use preferences (i.e., $p_{ui}$=1) and add them in P, which becomes pre-use preference matrix $\hat{P}$ (Step 2).

<Inference of Pre-Use Preferences>

To discern a user's uninteresting items, the item recommendation apparatus infers pre-use preferences of the user for all unrated items. Basically, determining pre-use preference $p_{ui}$ is straightforward when user u has rated item i (i.e., $r_{ui} \neq$null) because the rate items evaluated by user u should be interesting items of the user u, i.e., $I_u^{eval} \subseteq I_u^{int}$. For this reason, the pre-use preference $p_{ui}$ is set to as 1 in this case. When a user u has not evaluated an item i (i.e., $r_{ui}$=null), determining $p_{ui}$ becomes non-trivial. Therefore, the item recommendation apparatus accurately infer pre-use preferences $p_{ui}$ in this case.

So, the one-class collaborative filtering (OCCF) problem is needed to be considered. The OCCF problem occurs when a user gives a unary value to an item as user evaluation (i.e., 1 for a rated item and null for an unrated item). In this problem, ambiguity arises in the interpretation of unrated items.

That is, because negative and unlabeled positive examples exist together in unrated items, it is quite difficult to distinguish them. The unlabeled positive example means that a user's rating on the item is unknown because the user has not recognized it. If the user had known its existence, the user would have used and evaluated the item. Meanwhile, the negative example indicates that the user did not give a rating because the user was not interested in the item.

This problem setting happens when the item recommendation apparatus infers pre-use preferences for unrated items. That is, known pre-use preferences for rated items have a value of 1 (i.e., $p_{ui}=1$), and missing pre-use preferences for unrated items are ambiguous. In FIG. 4, Both unlabeled positive examples ($I_u^{int}-I_u^{eval}$) and negative examples ($I_u^{un}$) exist in the set of items whose pre-use preferences are unknown ($I-I_u^{eval}$).

The OCCF method is appropriate for inference of users' pre-use preferences on the unrated items. This method builds an SVD model with observed pre-use preferences, $p_{ui} \in P$, and their corresponding weights. If $p_{ui}$ is 1, its weight $w_{ui}$ is set as 1, which indicates the value of $p_{ui}$ accurately represents user u's opinion for item i. If $p_{ui}$ is null, the OCCF method initially assigns 0 to $p_{ui}$ and updates $p_{ui}$ using some weight $w_{ui}$.

Referring to a bottom right portion of FIG. 5, the item recommendation apparatus may determine pre-use preferences for unrated items in the observed pre-use preference matrix. For example, in the observed pre-use preference matrix, a value of "1" may be assigned to a rated item based on a pre-use preference.

The observed pre-use preference matrix may include unrated items to which the value of "1" is not assigned. The unrated items to which the value of "1" is not assigned may be interpreted as items that are not classified into i) an unlabeled positive example of items that are preferred by a user but are not used yet, and ii) a negative example of items that are not preferred by the user.

In the unlabeled positive example, an item may not be used yet because a user has not recognized the item, and may be likely to be recommended by the item recommendation apparatus or likely to be rated. In other words, the unlabeled positive example may contain a positive meaning that unrated items may be evaluated later based on user's pre-use preferences, and items corresponding to the positive meaning may correspond to, for example, items in a difference of the sets, A-C of FIG. 4.

In the negative example, an item may not be intentionally evaluated by the user because the user is not interested in the item. In other words, the negative example may contain a negative meaning that unrated items may not meet user's pre-use preferences, and items corresponding to the negative meaning may correspond to, for example, items in the set $A^c$ of FIG. 4.

When the item recommendation apparatus distinguishes the items corresponding to the positive meaning from the items corresponding to the negative meaning, a problem of ambiguity in interpretation of items may occur. Accordingly, to solve the problem, the item recommendation apparatus may apply a one-class collaborative filtering (OCCF) method.

In the conventional OCCF method, to set a weight to an unrated item, a value of "1" may be assigned to a pair of a user and a rated item, and various values may be assigned to a pair of a user and the unrated item. The item recommendation apparatus may assign a value of "1" to a pair of a user and a rated item as shown in the bottom left portion of FIG. 5, and may assign various values to a pair of a user and an unrated item. In Table 2, users U, items I and a value $p_{ui}$ assigned to a binary rating matrix P may be defined.

TABLE 2

| Notation | Definition |
|---|---|
| U | A group of users, e.g., users $u_1$, $u_2$ and $u_m$ |
| I | A set of items, e.g., items $i_1$, $i_2$ and $i_m$ |
| P | A value assigned to a observed pre-use preference matrix $(p_{ui})_{m \times n}$, where $p_{ui} \in \{0, 1\}$ |

The item recommendation apparatus may assign a binary number "0" or "1" to each of items of the observed pre-use preference matrix based on whether the items are rated among user-item pairs. Also, the item recommendation apparatus may assign a separate value, instead of a value of "0," to an unrated item during updating.

An item in a user-item pair to which a value of "0" is assigned in the observed pre-use preference matrix may be interpreted as an item that is not preferred by the user, however, setting items in all pairs as items that are not preferred by users may be incorrect. In other words, if the unrated items may have preferred external features, assigned values of "0" may be incorrect. Accordingly, the item recommendation apparatus may assign a weight to each of user-item pairs in the binary rating matrix.

To this end, the item recommendation apparatus may use three schemes to assign a weight to each of user-item pairs to which a value of "0" is assigned in the binary rating matrix. More specifically, the OCCF method has three different schemes for determining the weights: uniform, user-oriented, and item-oriented schemes. Here, the user-oriented scheme was the best embodiment. The user-oriented scheme assumes that, as a user rates more items, user is more likely to dislike unrated items. That is, it computes the weight $w_{ui}$ in proportion to the number of rated items evaluated by user i: $w_{ui}=\Sigma_i Pui$ In an example, the item recommendation apparatus may use a uniform scheme to assign a weight to a user-item pair.

The uniform scheme may refer to a scheme of assigning the same weight to items that are not preferred by a user. In the uniform scheme, a value pre-defined by a domain expert may be assigned to all pairs of users and unrated items.

In another example, the item recommendation apparatus may use a user-oriented scheme to assign a weight to a user-item pair.

In the user-oriented scheme, a weight for a pair of a user and an unrated item may be proportional to the number of items evaluated by the user. In the user-oriented scheme, a weight for an item that is not preferred by the user may be determined in proportion to a number $\Sigma_i p_{ui}$ of rated items evaluated by the user.

In still another example, the item recommendation apparatus may use an item-oriented scheme to assign a weight to a user-item pair.

In the item-oriented scheme, a weight may be determined based on an rated item evaluated by a user the large number of times. In the item-oriented scheme, a weight for an item that is not preferred by a user may be determined in proportion to the number of preferences for rated items evaluated by the user. The number of the preferences may be represented by, for example, "$m-\Sigma_u p_{ui}$."

To consider users' evaluated items and their weights simultaneously, the OCCF method employs the weighted alternating least squares (wALS) method in building a singular value decomposition (SVD) model with weights. It infers the preference scores for each user's unrated items via the SVD model. The wALS method decomposes a matrix P into two low-rank matrices X and Y while optimizing an objective function £(X, Y).

The matrix P represents observed pre-use preferences in our case, i.e., $P=(p_{ui})_{m \times n}$. The matrices X and Y represent the features of users and items for latent factors, respectively. The objective function is represented as follows:

The item recommendation apparatus may generate a SVD model by considering a weight corresponding to each of user-item pairs in the observed pre-use preference matrix. In the SVD model, pre-use preference for each pair of a user and an unrated item whose value is 0 in the observed pre-use preference matrix may be more accurately calculated and be assigned a new value.

To generate the SVD mode based on weights, the item recommendation apparatus may apply a weighted low rank approximation (wLRA) scheme. The wLRA scheme may decompose a rating matrix into two low-rank matrices, for example, matrices X and Y to satisfy an objective function. The matrices X and Y may represent features of users and items for latent factors, respectively. The latent factors may refer to a characteristic of items and a user's pre-use preference. The objective function may be represented as shown in Equation 1 below.

$$\mathcal{L}(X, Y) = \sum_u \left[ \sum_i w_{ui} \{ (p_{ui} - X_u Y_i^T)^2 + \lambda(\|X_{u(\cdot)}\|_{F2} + \lambda \|Y_{i(\cdot)}\|_{F2}) \} \right]$$ [Equation 1]

where $p_{ui}$ and $w_{ui}$ are the entries in the observed pre-use preference matrix P and the weight matrix W, respectively. The vector $X_u$ is the u-th row of matrix X, and the vector $Y_i$ is the i-th row of matrix Y. The two vectors represent the features of user u and item i. Also, $\|\bullet\|_F^2$ denotes the Frobenius norm and λ is a regularization parameter.

In Equation 1, $p_{ui}$ and $W_{ui}$ denote an element of a rating matrix and an element of a weight matrix for a single pair of a user and an item, respectively. In addition, $X_u$ and $Y_i$ denote features of users and items for latent factors, respectively, and may be represented as vectors. The vector $X_u$ may correspond to a u-th row of the matrix X, and the vector Y, may correspond to an i-th row of the low-rank matrix Y. In addition, $\|\bullet\|_F^2$ denotes a two-dimensional (2D) Frobenius norm, and λ denotes a regularization parameter.

Also, in order to build the matrices X and Y, the item recommendation apparatus may first assign random values to all elements of the matrix Y, and then updates the matrix X using Equation 2 by minimizing the objective function defined in Equation 1.

In order to factorize the matrix P, the OCCF method first assigns random values to elements in the matrix Y, and updates elements in the matrix X as in Equation 2 by optimizing the objective function.

$$X_{u(\cdot)} = p_{u(\cdot)} \tilde{\omega}_{u(\cdot)} Y \left( Y^T \tilde{\omega}_{u(\cdot)} Y + \lambda \left( \sum_i w_{ui} \right) L \right)^{-1},$$ [Equation 2]

$$\forall 1 \leq u \leq m$$

In Equation 2, $\tilde{w}_{u(\cdot)}$ denotes a diagonal matrix with elements of a u-th row vector $W_{u(\cdot)}$ of a matrix W on a diagonal line, and I denotes an identity matrix. where $w_{u(\cdot)}$ is a diagonal matrix with elements of $w_{u(\cdot)}$ on the diagonal, and matrix L is an identity matrix. After that, the OCCF method updates elements in the matrix Y while fixing the matrix X as in Equation 3. The matrix X may be fixed and all row vectors of the matrix Y may be updated based on Equation 3 shown below.

$$Y_{i(\cdot)} = p_{(\cdot)i}^T \tilde{w}_{(\cdot)i} X \left( X^T \tilde{w}_i X + \lambda \left( \sum_u w_{ui} \right) L \right)^{-1},$$ [Equation 3]

$$\forall 1 \leq i \leq n$$

In addition, the item recommendation apparatus may optimize the objective function by repeatedly calculating Equations 2 and 3 until the matrices X and Y converge to a local optimum.

The objective function by repeating Eq2. and Eq3 may be optimized until matrices X and Y converge to a local optimum. Finally, we approximate matrix $\hat{p}_{ui}$ calculating an inner product of X and Y as in Eq4, where an entry $\hat{p}_{ui}$ in the matrix $\hat{P}$ represents a pre-use preference score of user u for item i.

The item recommendation apparatus may calculate an approximate value $\hat{P}$ by combining the matrices X and Y, and $\hat{p}_{ui}$ denotes a pre-use preference of a user for an item. The approximate value $\hat{P}$ may be represented as shown in Equation 4 below.

$$\hat{P} \approx P = XY^T$$ [Equation 4]

Thus, the item recommendation apparatus may determine a weight for a pair of a user and an unrated item using the OCCF method, and generate the SVD model using the wLRA scheme, to predict the unknown pre-use preferences.

<Zero-Injection>

The item recommendation apparatus may builds a zero-injected matrix $Z=(z_{ui})$ m×n where entry $z_{ui}$ represents user u's rating for item i (Step 3).

The item recommendation apparatus may determine a user-item pair with a low pre-use preference for each of pairs of users and unrated items, and may assign a value of "0" to the user-item pair having a low pre-use preference. To this end, the item recommendation apparatus may perform filtering on pre-use preference, and may extract an item with a weight that is smaller than a threshold preference. The item recommendation apparatus may perform filtering on a user-item pair to having a pre-use preference corresponding to a bottom θ%. θ denotes a given parameter, and will be further described with threshold preference to FIG. 5 below.

The above process is called zero-injection, which assigns zero ratings to uninteresting items of a user. Specifically, in zero-injection, there are two challenges that need to be addressed: (1) how to point out uninteresting items of a user based on the pre-use preference scores inferred by the OCCF method, and (2) how to augment a rating matrix by utilizing the identified uninteresting items.

First, the uninteresting items of a user is determined based on user's pre-use preferences. Since it is impossible to know pre-use preferences that a user really has, the pre-use preference scores are inferred by the OCCF method to identify uninteresting items. Specifically, a user u's uninteresting items are defined as follows:

$$I_u^{un}(\theta) = \{i \mid \rho(\hat{p}_{ui}) \leq \theta\}$$ [Equation 5]

where $\rho(\hat{p}_{ui})$ indicates the percentile rank of $\hat{p}_{ui}$ whose corresponding rating is missing in R. We note that the numbers of uninteresting items are different depending on users. For instance, $I_u^{un}$ refers to uninteresting items as those items whose pre-use preference score ranks are at the bottom 5%.

In Eq. (5), uninteresting items are defined as the items whose pre-use preference scores are relatively smaller than others. In this equation, an absolute cut off value for pre-use preference scores is not used because the OCCF method is originally designed for computing users' relative preferences. In addition, by changing the parameter θ, tradeoff between accuracy and computing power for top-N recommendation is determined. If θ is set large, the number of zero ratings increases. In this case, a CF method needs more resources such as memory, disk space, and CPU but tends to produce more accurate results.

That is, $z_{ui}$ is set as $r_{ui}$ when user u actually evaluate item i and is set as 0 if $p_{ui}$ is ranked within the bottom θ%. The CF method is applied to Z to predict the post-use preferences of empty entries (dotted circles) in Z (Step 4).

Finally, the item recommendation apparatus recommends top-N items to an active user.

The item recommendation apparatus be more effective than even asking the user to select the uninteresting items. In a real situation, the user has glanced at only a few items whose number is fairly small compared to that of whole items, indicating that the user really knows about only a small part of her uninteresting items. In contrast, The item recommendation apparatus finds the uninteresting items that the user has not recognized yet but are likely to be considered uninteresting when discovering them. For this reason, The item recommendation apparatus improves CF methods by providing almost all uninteresting items.

After finding uninteresting items, the item recommendation apparatus assigns a zero value to $r_{ui}$ if item i is decided as user u's uninteresting item. The item recommendation apparatus process of filling a part of missing ratings in R with zeros as the zero-injection. The item recommendation apparatus choose a zero for missing ratings because a user would not be satisfied with user's uninteresting items even when recommended with. Moreover, in this assumption, a user would prefer uninteresting items less than all the rated items, including the items rated as 1.

By augmenting a rating matrix R with zeros, the zero-injection builds a new matrix that contains zero ratings as well as actual user ratings.

Referring to a top right portion of FIG. 5, the item recommendation apparatus may generate a zero-injected matrix based on a rating matrix. In other words, the item recommendation apparatus may need to predict a post-use preference of a user for an item.

For example, a post-use preference for an item having a high pre-use preference may be highly likely to have various values, whereas a post-use preference for an item having a low pre-use preference may be highly likely to have a low value. In other words, the item having the low pre-use preference may have an external feature that is not preferred by a user and accordingly, a preference for the item with the external feature may be evaluated to be low even after the item is used.

For example, a user who does not prefer a horror genre may not use content, for example, a horror movie or a horror comic. Even when the user uses the content, a frequency of use of the content may be remarkably low.

Accordingly, the item recommendation apparatus may determine a user-item pair with a low pre-use preference, and may assign a value of "0" to the determined user-item pair. A process of assigning the value of "0" may be defined as a "zero-injection."

The item recommendation apparatus may generate a zero-injected matrix in which a value of "0" is assigned to a user-item pair with a pre-use preference smaller than the threshold preference. In other words, the item recommendation apparatus may assign a value of "0" to each of uninteresting items, that is, items included in the set $A^c$ of FIG. 4.

The value of "0" may be assigned because a user may like items corresponding to the bottom θ% less than rated items. In other words, the rated items may be items with high pre-use preferences and may have external features preferred by the user, whereas items having low pre-use preferences may hardly have the user's favorite external features.

Accordingly, the item recommendation method may perform a zero-injection on unrated items, by selecting items determined to have low pre-use preferences (for example, the items in the set $A^c$ of FIG. 4), and by assigning a value of "0" to the selected items.

The item recommendation apparatus may not artificially assign a value of "0" to the same number of items. Because a number of preferred items may be determined based on users, the value of "0" may be assigned to items corresponding to the bottom θ% based on the determined weights.

Thus, the item recommendation apparatus may assign a value of "0" to a pair of a user and an item with a pre-use preference smaller than the threshold preference among unrated items to which user's post-use preferences are not assigned, and may generate a zero-injected matrix based on the rating matrix. The zero-injected matrix may include the value of "0," and a value of a post-use preference assigned to a rated item in the rating matrix. The zero-injected matrix with the value of "0" may be defined as a zero-injected matrix Z. The zero-injected matrix $Z=(z_{ui})$ is m×n, where entry $z_{ui}$ can be represented as follows:

The item recommendation apparatus may assign a value to a user-item pair of a zero-injected matrix based on a criterion shown in Table 3 below.

TABLE 3

| Value of Element | | Condition |
| --- | --- | --- |
| $z_{ui}$ | $r_{ui}$ | User u evaluated item i |
| | 0 | User u did not evaluate item i, i is uninteresting to u |
| | Null | Otherwise (User u did not evaluate item i, i is interesting to u) |

Note that $z_{ui}$ is set as $r_{ui}$ if a user u has rated an item i. On the other hand, if the item i has not been evaluated by the user u ($r_{ui}$=null) and its pre-use preference $p_{ui}$ is not high, $z_{ui}$ is set as 0. Otherwise, $z_{ui}$ is set as null. Entry $z_{ui}$ indicates user u's rating for item i. When the value of $z_{ui}$ is zero, it implies that user u is very unlikely to like item i even though i is recommended to u. When the value of $z_{ui}$ is the rating $r_{ui}$ given by user u, it indicates that user u is satisfied with item i to the extent that its rating score indicates. When $z_{ui}$ is null, the rating of (u, i) is not identified yet at this point.

The injected zero ratings as well as users' ratings in CF methods, enabling apply any of CF methods to the zero-injected matrix Z instead of the original rating matrix R. Therefore, our proposed approach is orthogonal to CF methods, which is one of our strengths.

There are a number of CF methods, each of which provides different accuracies depending on application domains. The item recommendation apparatus provides an interface to choose its preferred CF method that works well in its application domain.

When CF methods are applied, the zero-assigned items are excluded from a recommendation list (as ratings are zero). The CF methods consider all items whose ratings are missing in R as recommendation candidates. Therefore, the zero-injected matrix not only addresses the data sparsity problem by filling many zero ratings, but also prevents a user's uninteresting items from recommendation.

In Table 3, $r_{ui}$ denotes a post-use rating given to an item by a user. When a user evaluates an item, a value of the rated item based on the rating may be assigned. Also, "0" may be assigned in an example in which a user does not evaluated an item and the unrated item that are uninteresting to a user, and a null value may be assigned in the other examples. The null value may be a value that is not evaluated yet and that is assigned to an item as a recommendation target.

The item recommendation apparatus may exclude an item to which a value of "0" is assigned and an rated item by a user from items to be recommended, and may recommend the other items, that is, items with null values to the user using the zero-injected matrix. The item recommendation apparatus may predict user's post-use preferences for empty entries in the top right portion of FIG. 5, and may recommend a few items obtained by filtering to the user.

Figure 6:
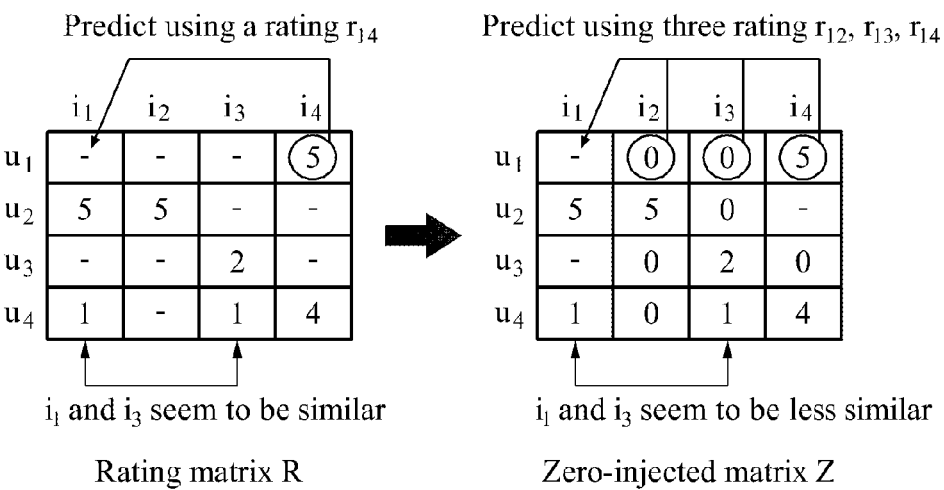
FIG. 6 is a diagram for a rating matrix and zero-injected matrix in collaborative filtering according to an embodiment.

FIG. 6 is a diagram for rating matrix and zero-injected matrix in collaborative filtering according to an embodiment.

<Applying the Zero-Injected Matrix>

Because the zero-injected matrix has additional information on uninteresting items, it helps improve the accuracy of CF methods. The below description is explained the effect of our proposed method when applied to two CF methods: the item-based method (ICF) and the SVD-based method (SVD), which are well known ones among memory-based and model-based approaches.

ICF predicts a rating $\tilde{z}_{ui}$ for a target item i of a user u by referencing her ratings on those items similar to the item i as follows:

$$\tilde{z}_{ui} = \frac{\sum_{j \in S_i} \{z_{uj} * sim(i, j)\}}{\sum_{j \in S_i} sim(i, j)} \quad \text{[Equation 6]}$$

where $S_i$ is a set of k items that have rating patterns most similar to that of item i and user u's rating is known for. If there are less than k users who have rated item i, $S_i$ includes items whose number is equal to that of those users. In addition, sim(i, j) denotes the similarity between items i and j in terms of rating patterns.

FIG. 6 illustrates the difference between a rating matrix R and its corresponding zero-injected matrix Z built by the item recommendation apparatus. Compared to the matrix R, Z has extra zero ratings (in boldface) implying users' uninteresting items.

It is supposed that ICF predicts the rating $r_{11}$ of a user $u_1$ for an item $i_1$ when its parameter k is set as 3. With the rating matrix, it refers to only $r_{14}$ for prediction 1 because $u_1$ has not rated $i_2$ and $i_3$ (i.e., $r_{12}$ and $r_{13}$ are nulls). Therefore, its predicted rating would be inaccurate due to the sparsity problem. On the other hand, ICF considers more ratings, $z_{12}$ and $z_{13}$, in addition to $z_{14}$ with Z. This is because item set S, contains a more number of ratings, including two uninteresting items.

In addition, our proposed method helps find the items that are truly similar. With rating matrix R, ICF may conclude that $i_1$ and $i_3$ are highly similar because $u_4$ gives 1 to both of them. However, the similarity can be inaccurate because it is based on only one user's opinion. With Z, the two items are regarded less similar because $u_2$ rated two items quite different. As such, the zero-injected matrix is useful to compute a more accurate similarity because it enables CF to reflect more users' opinions. In particular, the zero-injection makes it possible for ICF to successfully find a pair of similar users who have a set of "uninteresting" items in common.

In FIG. 6, the accuracy improvement is described owing to a more number of items in $S_i$. Moreover, even when the number of items in $S_i$ is the same, the accuracy could increase with our zero-injected matrix because $S_i$ contains those items more similar to item i.

The item recommendation apparatus may assign a value of "0" to items that are uninteresting to a user, instead of assigning the value of "0" to all unrated items. Also, the item recommendation apparatus may calculate a similarity between an item rated by a user and an item rated by another user, and may evaluate a target item based on the similarity, to derive a more exact recommendation result based on a zero-injected matrix.

The item recommendation apparatus may assign a value to an item that is not preferred by a user, using the zero-injected matrix and thus, an accuracy of a collaborative filtering (CF) method may be enhanced. The CF method may enhance an accuracy based on an item-based CF (ICF) method and an SVD method.

The item recommendation apparatus may show different results for the rating matrix shown in the top left portion of FIG. 6 and the zero-injected matrix shown in the top right portion of FIG. 6. Unlike the rating matrix shown in the top left portion of FIG. 6, the zero-injected matrix shown in the top right portion of FIG. 6 may include a value of "0" assigned to an item that is not preferred by a user.

For example, in FIG. 6, the item recommendation apparatus may predict the item $i_1$ based on a value of an item $i_4$, which may lead to an occurrence of a scarcity problem. In other words, the item recommendation apparatus may require additional information on items $i_2$ and $i_3$ in the zero-injected matrix to predict the item $i_1$.

Accordingly, the item recommendation apparatus may extract an item with a higher post-use preference score predicted based on a zero-injected matrix in which a value of "0" is assigned to an item that is not preferred by a user.

Referring to the zero-injected matrix and the rating matrix of FIG. 6, a value of "1" may be assigned to each of items $i_i$ and $i_3$ of a user $u_4$ and accordingly, the item recommendation apparatus may determine a similarity between the items $i_1$ and $i_3$ to be high. However, because the value of "1" may be assigned to the items $i_1$ and $i_3$ based on a personal opinion of the user $u_4$, it may be difficult to accurately determine the similarity between the items $i_i$ and $i_3$ to be high.

Based on the zero-injected matrix, the item recommendation apparatus may determine that the items $i_i$ and $i_3$ are less similar to each other, because a value of an item $i_2$ for the user $u_4$ is different from the value of "1" assigned to the items $i_i$ and $i_3$.

Because a larger number of users' opinions are reflected in the zero-injected matrix, an accurate similarity between items may be calculated in comparison to the rating matrix. Accordingly, it is possible to recommend a more accurate item to a user based on a post-use preference of the user. Thus, the item recommendation apparatus may more successfully extract a user-item pair including an item that is not preferred by the user in common, using the ICF method.

The item recommendation method may be enhanced in comparison to an existing SVD method. In other words, the item recommendation method may generate a zero-injected matrix and low-rank matrices X and Y with a dimension F based on the SVD method. One low-rank matrix may be an m-by-f user-factor matrix, and the other may be an n-by-f item-factor matrix. Each user may be associated with an F-dimensional vector $x_a \in \mathbb{Z}^f$, and each item may be involved with an F-dimensional vector $y_i \in \mathbb{Z}^f$. In addition, an item may be recommended using Equation 6 below.

$$\hat{z}_{ui} = z_{ui} + x_u y_i^T \quad \text{[Equation 7]}$$

In Equation 7, $\hat{z}_{ui}$ denotes a matrix including a value of an item recommendable using a zero-injected matrix with a pair of a user u and an item i. Also, $z_{ui}$ denotes a zero-injected matrix.

With the original rating matrix in FIG. 6, SVD cannot recognize that $u_2$ is related to $u_1$ or $u_3$ because they have no common items rated. In contrast, using Z, it now successfully observes the relationship between those users, i.e., both $u_2$ and $u_1$ are not interested in $i_3$, and have different opinions on $i_2$. Similarly, it also misses items' relationships such as $i_2$ and $i_3$ with R while it is able to find the relationships with Z. Therefore, SVD can build a better model representing more latent relationships among users and items with zero-injected matrix, which helps improve the overall accuracy of top-N recommendation.

Figure 7:
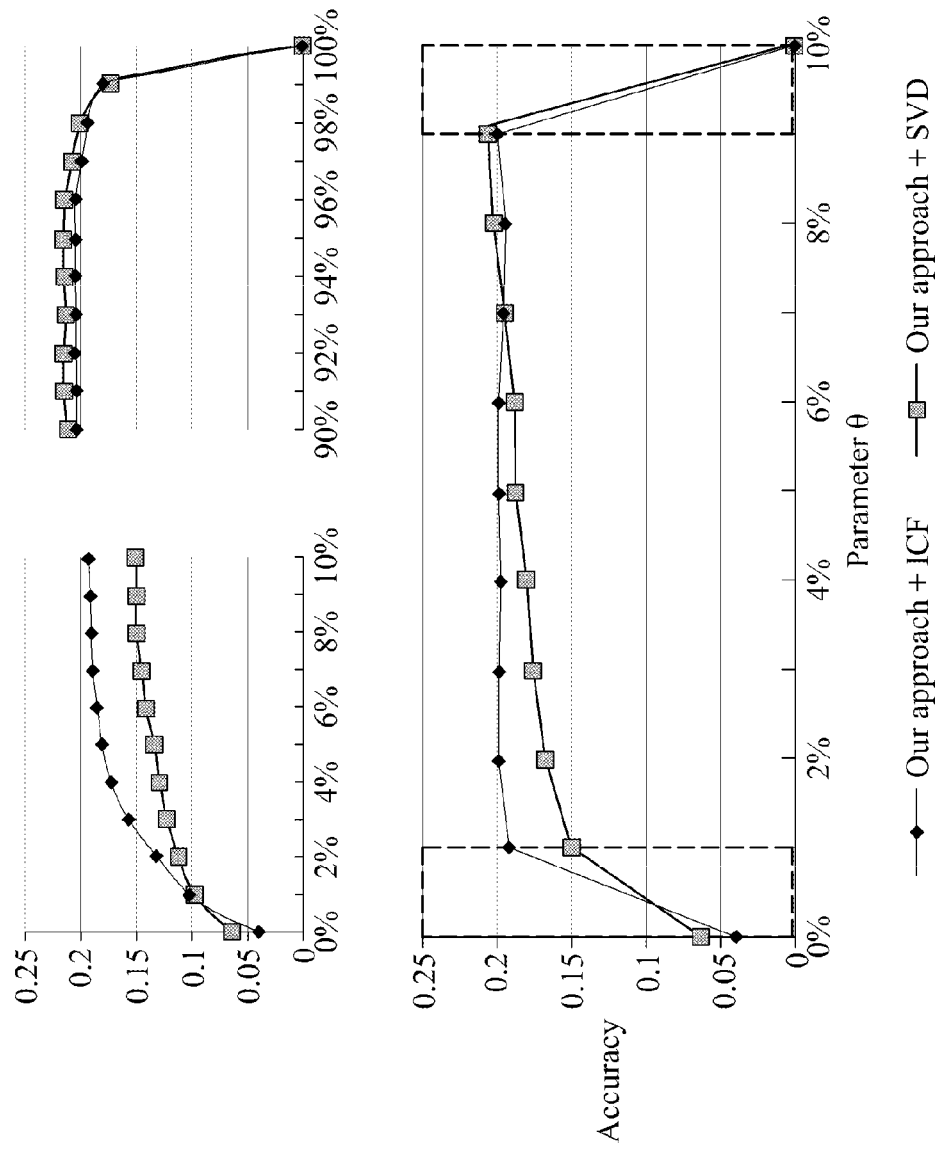
FIG. 7 illustrates a accuracy of proposed method for a parameter $\theta$ according to an embodiment.

FIG. 7 illustrates an accuracy of proposed method for a parameter θ according to an embodiment.

<Effect of Parameter θ>

In our proposed method, because parameter θ controls the amount of value imputation with the zero-injection, it greatly affects the accuracy in recommendation. In order to verify the effect of θ, we build different zero-injected matrices according to θ and apply them to two CF methods: item-based CF (ICF) and SVD-based CF (SVD). We adopt the OCCF method for inferring pre-use preferences.

FIG. 7 shows the accuracy of top-N (N=5) recommendation with ICF and SVD with varying θ. We increase θ in the increment of 10% for the range of 10-90%, and also increase θ in the increment of 1% for two extreme ranges, 0-10% and 90-99.7%. Note that we do not report the result with θ=100% because CF methods with our approach recommend nothing in this case. For this reason, we set θ as 99.7% in order to leave only 5 items whose pre-use preference scores are the highest for each user.

In this case, these 5 remaining items are thus all recommended (as top-5) to each user without requiring further CF methods. In summary, the result with θ=0% indicates the accuracy of original ICF and SVD without using our approach; the result with θ=99.7% indicates the accuracy of the OCCF method without using ICF or SVD.

In FIG. 7, it is observed that the results of precision, recall, nDCG, and MRR show quite similar tendencies. All these values of CF methods increase as parameter θ increases when θ is smaller than 95%. Moreover, they grow rapidly when θ is smaller than 10%. All the graphs show that our proposed method dramatically improves the accuracy of two original CF methods.

ICF using our proposed method with θ=96% shows the best accuracy, 5.2 times higher than ICF without our approach in terms of precision. When θ=95%, our approach improves the accuracy of SVD by 3.4 times.

As mentioned earlier, the OCCF method can be used to produce top-N recommendation without using ICF and SVD (i.e., θ=99.7%). The method, however, shows accuracy much lower than ICF and SVD equipped with our approach.

This result implies that, the OCCF method is quite effective in finding uninteresting items. However, it is not that effective in recommending final items because it ignores rating scores.

The accuracy changes greatly when θ is smaller than 10% or more than 90% while it changes little when θ is between 10% and 90%. It is interpreted that this phenomenon as follows: (1) as θ increases to 10%, more user-item pairs (i.e., highly likely to be uninteresting) are filled with zeros (giving accurate and useful information to CF methods) and are also correctly excluded from recommendation. (2) When θ ranges between 10% and 90%, accuracy changes little because filling unrated user-item pairs in the case (1) has already alleviated most of the data sparsity problem. Filling more zero ratings no longer gives useful information to CF methods although user-item pairs whose θ is between 10% and 90% are highly likely to be uninteresting (See Section 4.2.2.). (3) When θ is larger than 90%, the accuracy decreases significantly. As θ reaches 99.7%, more user-item pairs having high pre-use preferences (i.e., could be interesting to users) are mistakenly filled with zeros (giving inaccurate and less useful information to CF methods) and could be incorrectly excluded from recommendation.

Referring to FIG. 7, an item recommendation apparatus may predict pre-use preferences for each user's unrated items and then may determine the user-item pairs with a pre-use preferences smaller than a threshold preference. The item recommendation apparatus may extract at least one user-item pair ranked in a bottom θ% as a threshold preference. A user-item pair with a low pre-use preference may be assumed to have a low post-use preference of a user and accordingly, the item recommendation apparatus may determine the bottom θ%.

The item recommendation apparatus may assign a value of "0" to some empty entries in a rating matrix based on the parameter θ determined to the number of filling entries and then generate the zero-injected matrix. Graphs of FIG. 7 show results obtained by analyzing accuracies based on a change in the parameter θ in an ICF method and an SVD model. The parameter θ may increase in an increment of 10%, and may more precisely increase in an increment of 1% for a range in which an accuracy extremely changes, for example, a range of 0% to 10% and a range of 90% to 100%.

In the graphs, an accuracy of the ICF method is enhanced by 5.2 times when the parameter θ is 96%, and an accuracy of the SVD model is enhanced by 3.4 times when the parameter θ is 95%. Also, the accuracy of the ICF method is enhanced in response to the parameter θ increasing to 96%. The accuracy of the ICF method greatly increases when the parameter θ is smaller than 10%, and slightly increases when the parameter θ increases to 96%. Similarly to the accuracy of the ICF method, the accuracy of the SVD model may increase based on a change in the parameter θ. When the parameter θ increases from 10% to 90%, accuracy of the SVD model may be enhanced further than the accuracy of the ICF method.

The accuracy of the ICF method may relatively dramatically change in the range of 0% to 10% and a range greater than 95% based on the parameter θ. The accuracy may little change or relatively slightly change in a range greater than 10% and smaller than 95% because filling unrated user-item pairs in the range of 0% to 10% has already provide enough information about users.

In the range greater than 0%, there is no difference between the accuracies, and in the range greater than 95%, the accuracies may greatly decrease. Accordingly, the item recommendation apparatus may determine the accuracy of the ICF method based on the zero-injected matrix, and may determine the parameter θ in ranges other than the range of 0% to 10% and the range greater than 95%.

Because the number of zeros added to a zero-injected matrix increases as the parameter θ increases, a time required for the item recommendation apparatus to recommend an item may increase. Accordingly, the item recommendation apparatus may determine a more efficient parameter θ based on the time required to recommend an item based on a parameter θ.

Figure 8:
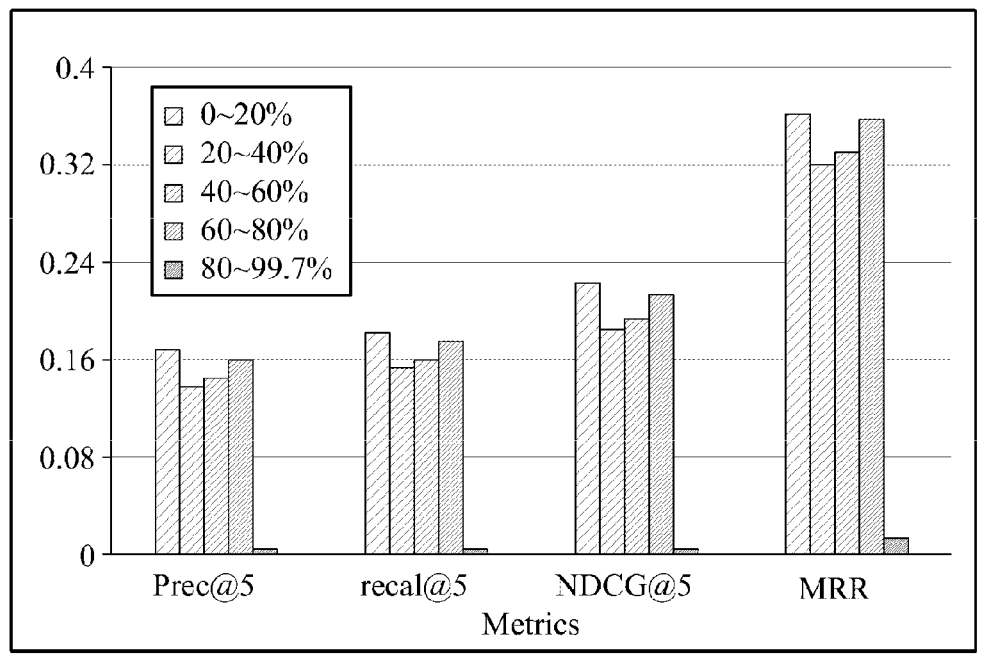
FIG. 8 illustrates a accuracy of SVD with five uninteresting item sets defined by inverse percentile rank according to an embodiment.

FIG. 8 illustrates a accuracy of SVD with five uninteresting item sets defined by percentile rank according to an embodiment To understand this phenomenon more clearly, it is defined five sets of uninteresting items according to the percentile rank ρ of pre-use preference scores. FIG. 8 shows the accuracy of SVD with the five sets of uninteresting items including those items whose ρ is 0-20, 20-40, 40-60, 60-80, and 80-99.7%, respectively. In the results, all accuracy metrics show similar tendencies. The four results of 0-20, 20-40, 40-60, 60-80% produce good accuracy, while that of 80-99.7% shows significantly worse accuracy. This implies that, among the items whose ρ is 0-80%, there are only a few interesting items (errors) as we explained above. However, among the items whose ρ is 80-99.7%, there are many interesting items. This phenomenon is also observed in Section 4.2.2.

We conclude that accuracy increases greatly when θ is smaller than 10% while it decreases significantly when θ is more than 90%. In addition, it remains quite high and changes little in a large interval of 10%≤θ≤95%, indicating that we can obtain a high accuracy if we arbitrarily choose any value in that interval making our method parameter-insensitive.

Figure 9:
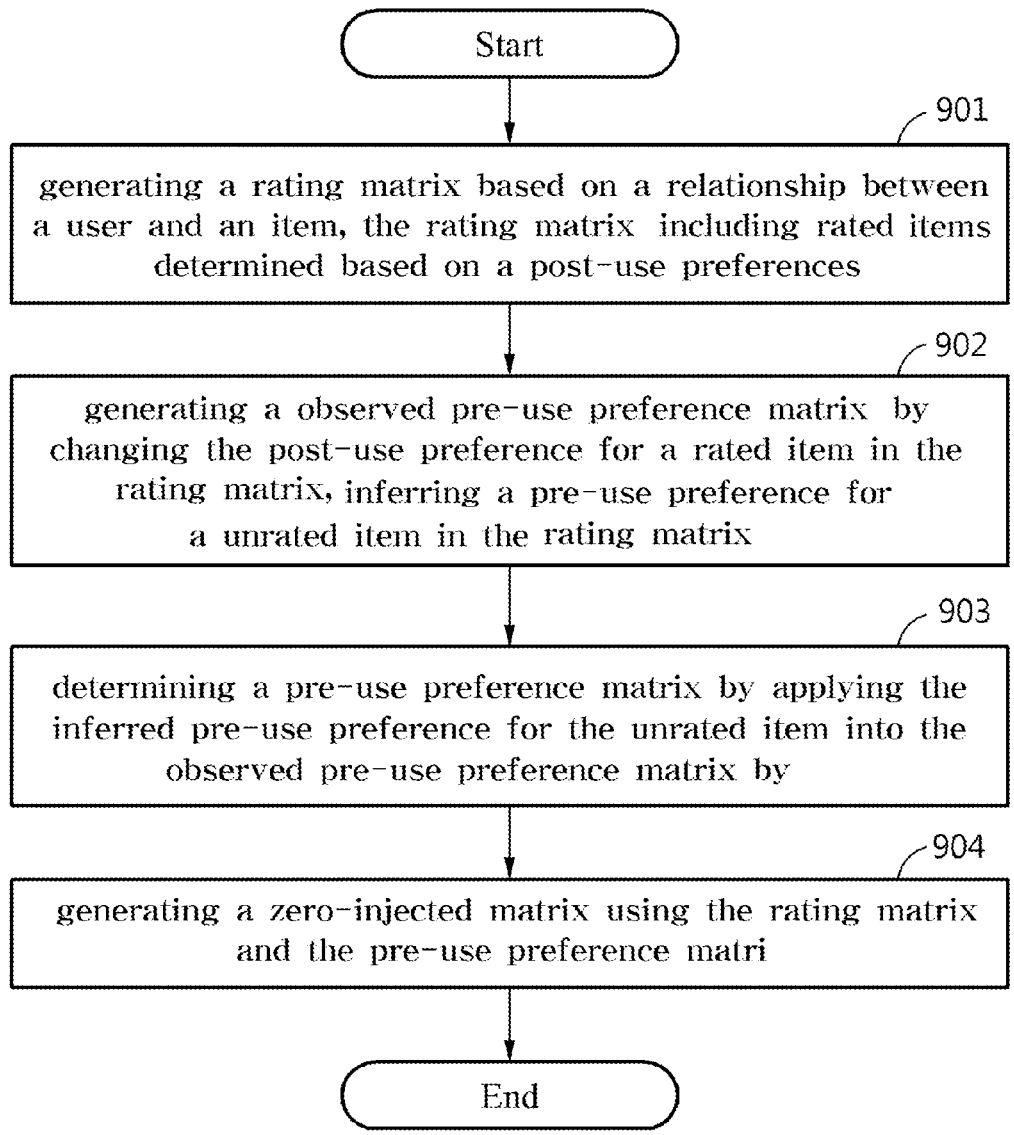
FIG. 9 is a flowchart illustrating an item recommendation method according to an embodiment.

FIG. 9 is a flowchart illustrating an item recommendation method according to an embodiment.

Referring to FIG. 9, in operation 901, an item recommendation apparatus may generating a rating matrix based on a relationship between a user and an item. Here, the rating matrix includes ratings determined based on a post-use preferences. The rating is a value that the user express the satisfaction on an item after the user uses the item. The item recommendation apparatus generates the rating matrix may include generating a rating matrix associated with rated items after a plurality of users uses a plurality of items based on a propensity to use the items.

In operation 902, the item recommendation apparatus may generating a observed pre-use preference matrix by changing the post-use preference for a rated item in the rating matrix. To determine whether the user uses an item, the item recommendation apparatus may change the value of the post-user preference for the rated item in the rating matrix to a value of "1."

In operation 903, the item recommendation apparatus may infer a pre-use preference for a unrated item in the rating matrix; determining a pre-use preference matrix by applying the inferred pre-use preference for the unrated item into the observed pre-use preference matrix. In the other words, the item recommendation apparatus determines a pre-use preference for an unrated item to which a pre-use preference is not assigned in the observed pre-use preference matrix. For example, the item recommendation apparatus may use an OCCF method.

In operation 904, the item recommendation apparatus may generate a zero-injected matrix using the rating matrix and the pre-use preference matrix. The item recommendation apparatus extracts an item with a pre-use preference lower than a threshold preference in the pre-use preference matrix. The item having the pre-use preference smaller than the threshold preference may refer to an item that is not preferred by a user.

The item recommendation apparatus generates a zero-injected matrix may include assigning zero ratings to uninteresting items of each user. Here, the uninteresting item is unrated item having the inferred pre-use preference smaller than a threshold preference among the unrated items in the pre-use preference matrix.

The method according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An item recommendation method of an electronic device including a processor, the item recommendation method comprising:
generating, by the processor, a rating matrix based on a relationship between a user and an item; wherein the rating matrix including rated items determined based on a post-use preferences,
generating, by the processor, an observed pre-use preference matrix by changing the post-use preference for a rated item in the rating matrix;
inferring, by the processor, a pre-use preference for a unrated item in the rating matrix;
determining, by the processor, a pre-use preference matrix by applying the inferred pre-use preference for the unrated item into the observed pre-use preference matrix; and
generating, by the processor, a zero-injected matrix using the rating matrix and the pre-use preference matrix in accordance with a set of rules,
wherein a weight for a pair of a user and an unrated item are determined by using an one-class collaborative filtering (OCCF) method and generating singular value decomposition (SVD) model using weighted low rank approximation (wLRA) scheme to predict the pre-use preference matrix.

2. The item recommendation method of claim 1, wherein the generating the rating matrix may include generating a rating matrix associated with ratings given by users after a plurality of users uses a plurality of items based on a propensity to use the items.

3. The item recommendation method of claim 1, wherein the generating the pre-use preference matrix may include changing the post-use preference for the rated item in the rating matrix to 1.

4. The item recommendation method of claim 1, wherein the inferring the pre-use preference may include inferring the pre-use preference for the unrated item based on the observed pre-use preference matrix.

5. The item recommendation method of claim 1, wherein the generating a zero-injected matrix may include assigning a zero rating to an uninteresting item of the user.

6. The item recommendation method of claim 1, wherein the uninteresting item is the unrated item having the inferred pre-use preference lower than a threshold preference among the unrated items in the pre-use preference matrix.

7. An item recommendation apparatus comprising:
a processor;
a data storage device; and
computer readable code stored in the data storage device and executable by the processor, the computer readable code configured to:
generate a rating matrix based on a relationship between a user and an item; wherein the rating matrix including rated items determined based on a post-use preferences,
generate a observed pre-use preference matrix by changing the post-use preference for a rated item in the rating matrix;
infer a pre-use preference for a unrated item in the rating matrix;
determine a pre-use preference matrix by applying the inferred pre-use preference for the unrated item into the observed pre-use preference matrix; and
generate a zero-injected matrix using the rating matrix and the pre-use preference matrix in accordance with a set of rules,
wherein a weight for a pair of a user and an unrated item are determined by using an one-class collaborative filtering (OCCF) method and generating singular value decomposition (SVD) model using weighted low rank approximation (wLRA) scheme to predict the pre-use preference matrix.

8. The item recommendation apparatus of claim 7, wherein the processor is configured to generate the rating matrix may include generating a rating matrix associated with ratings given by users after a plurality of users uses a plurality of items based on a propensity to use the items.

9. The item recommendation apparatus of claim 7, wherein the processor is configured to generate the pre-use preference matrix may include changing the post-use preference for the rated item in the rating matrix to 1.

10. The item recommendation apparatus of claim 7, wherein the processor is configured to infer the pre-use preference may include inferring the pre-use preference for the unrated item based on the observed pre-use preference matrix.

11. The item recommendation apparatus of claim 7, wherein the processor is configured to generate a zero-injected matrix may include assigning a zero rating to an uninteresting item of the user.

12. The item recommendation apparatus of claim 7, wherein the uninteresting item is unrated item having the inferred pre-use preference smaller than a threshold preference among the unrated items in the pre-use preference matrix.

13. A game item recommendation handheld device comprising:
a processor;
a data storage device; and
computer readable code stored in the data storage device and executable by the processor, the computer readable code:
generating a rating matrix based on a relationship between a user and a game item;
wherein the rating matrix including rated game items determined based on a post-use preferences,
generating a observed pre-use preference matrix by changing the post-use preference for a rated game item in the rating matrix;
inferring a pre-use preference for a unrated game item in the rating matrix;
determining a pre-use preference matrix by applying the inferred pre-use preference for the unrated game item into the observed pre-use preference matrix; and
generating a zero-injected matrix using the rating matrix and the pre-use preference matrix in accordance with a set of rules, wherein a weight for a pair of a user and an unrated game item are determined by using an one-class collaborative filtering (OCCF) method and generating singular value decomposition (SVD) model using weighted low rank approximation (wLRA) scheme to predict the pre-use preference matrix.

14. The game item recommendation handheld device of claim 13, wherein the generating the rating matrix may include generating a rating matrix associated with ratings given by users after a plurality of users uses a plurality of game items based on a propensity to use the game items.

15. The game item recommendation handheld device of claim 13, wherein the generating the pre-use preference matrix may include changing the post-use preference for the rated game item in the rating matrix to 1.

16. The game item recommendation handheld device of claim 13, wherein the inferring the pre-use preference may include inferring the pre-use preference for the unrated game item based on the observed pre-use preference matrix.

17. The game item recommendation handheld device of claim 13, wherein the generating a zero-injected matrix may include assigning a zero rating to an uninteresting game item of the user.

18. The game item recommendation handheld device of claim 13, wherein the uninteresting game item is the unrated game item having the inferred pre-use preference lower than a threshold preference among the unrated game items in the pre-use preference matrix.

* * * * *